June 20, 1967 J. ARNAUD ETAL 3,327,242

CROSSED FIELD TUBE NOISE GENERATOR

Filed Jan. 7, 1963 2 Sheets-Sheet 1

INVENTORS
J. ARNAUD et P. CAHOUR

BY Paul M. Craig, Jr.
ATTORNEY

INVENTORS
J. ARNAUD et P. CAHOUR
BY Paul M. Craig, Jr.
ATTORNEY

United States Patent Office 3,327,242

Patented June 20, 1967

3,327,242

CROSSED FIELD TUBE NOISE GENERATOR

Jacques Arnaud and Pierre Cahour, Paris, France, assignors to CSF—Compagnie Generale de Telegraphie Sans Fil, Paris, France Filed Jan. 7, 1963, Ser. No. 249,627
Claims priority, application France, Jan. 11, 1962, 884,506, Patent 1,318,761; Oct. 11, 1962, 911,935
6 Claims. (Cl. 331—78)

The present invention relates to noise generators, and aims at realizing a generator delivering a relatively larger amount of noise power than the apparatus known heretofore.

The generator according to the present invention utilizes a tube enclosing an electron gun including a cathode and an electron-optical system with crossed electric and magnetic fields, and a pair of electrodes without delay properties, between which passes the beam issued by the gun and which displaces itself under the action of an electric field established between these two electrodes and a transverse magnetic field perpendicular to this electric field; at the end of its path the electron beam is captured by a collector.

Such tubes are already known as illustrated, for example, in FIGURE 1 of U.S. Patent 2,992,360 of Reverdin, assigned to the assignee of the present application but they have never been constructed and used as noise generators as the collector thereof is connected to the power source either directly or through a measuring apparatus of negligible impedance.

The present invention makes usage of the fact that such a tube is an inherent source of strong noise transported by the beam, and therefore proposes to utilize this noise in those cases where need therefor arises.

According to the present invention, there is inserted within the collector circuit of the tube described hereinabove a load impedance constituted either by a simple resistance or by a quadripole with filtering properties of one or several bands of desired frequencies, the noise voltage being collected for use at the terminals of this impedance.

The satisfactory operation of the noise generator envisioned by the present invention necessitates additionally that the output capacity thereof be reduced; one provides therefore appropriate measures and means to that effect within the tube, such as the reduction of the collector into a simple bar and/or an increase in the distance between the two electrodes without delay properties within the region of the collector.

Accordingly, it is an object of the present invention to provide a noise generator which effectively eliminates the shortcomings of the prior art devices as regards the noise power supplied thereby.

It is another object of the present invention to provide a noise generator which is capable of producing a high noise power output yet is extremely simple in design, compact in its dimension considering the power capabilities and without complicated structural parts that are difficult to manufacture and/or to install.

Still a further object of the present invention resides in the provision of a noise generator utilizing the inherent noise within a beam of electrons propagating within an interaction space in which prevail crossed electric and magnetic fields.

A further object of the present invention resides in the provision of a noise generator utilizing the collector of the tube as output for the noise signals.

These and other objects, features and advantages of the present invention will become more obvious from the following description when taken in connection with the accompanying drawing which shows, for purposes of illustration only, several embodiments in accordance with the present invention, and wherein FIGURE 1 is a longitudinal cross sectional view of a linear noise generator tube connected to its load impedance circuit in accordance with the present invention, taken along line I—I of FIGURE 2;

Figures 1, 2, 3:
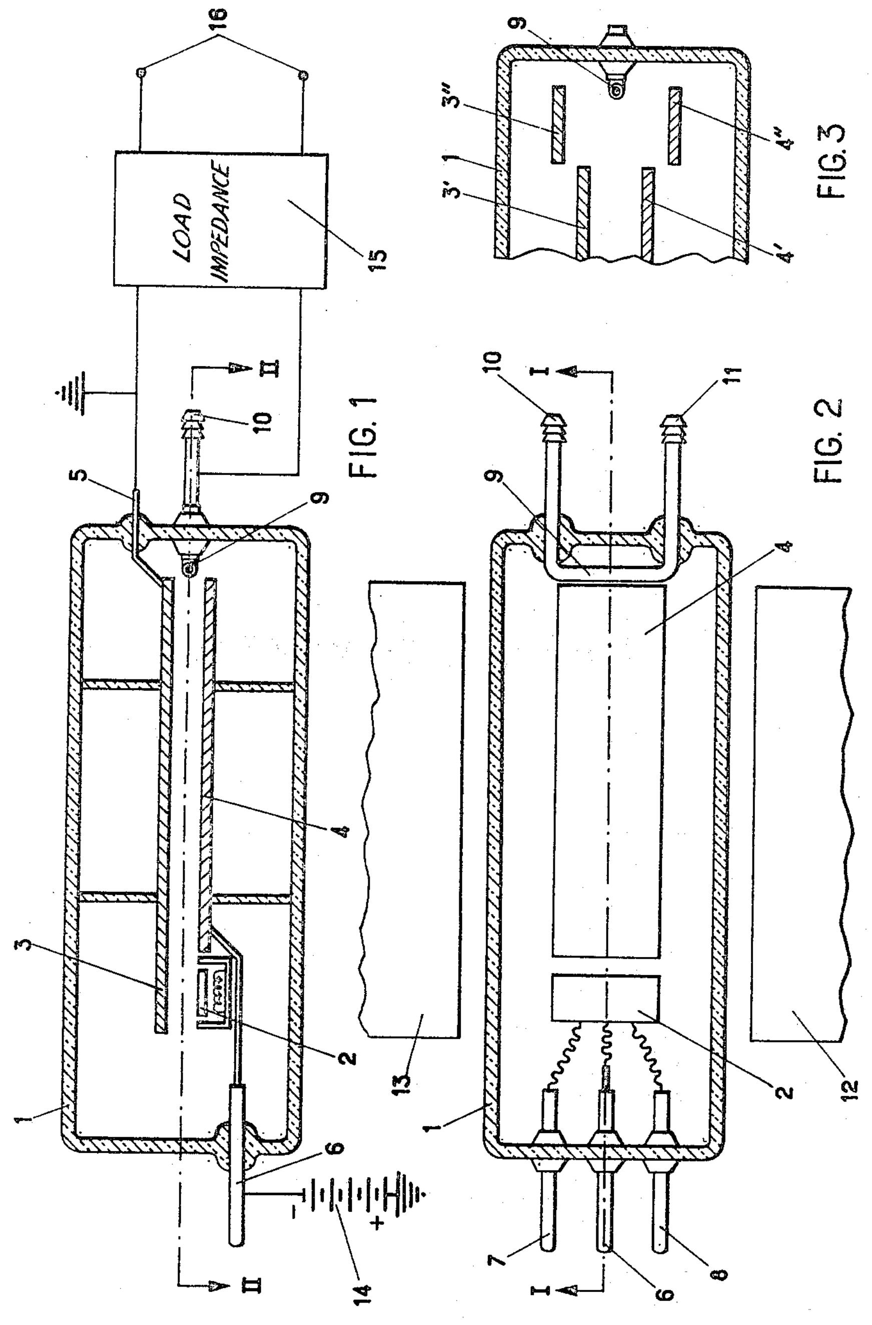
FIGURE 2 is a cross sectional view of the noise generator shown in FIGURE 1, taken along line II—II of FIGURE 1.
FIGURE 3 is a partial cross sectional view, similar to FIGURE 1, of a modified embodiment of a noise generator in accordance with the present invention.

Referring now to the drawing wherein like reference numerals are used throughout the various views to designate corresponding parts, and more particularly to FIGURES 1 and 2, reference numeral 1 designates therein an enclosure, for example, made of glass which contains an electron gun including a cathode 2, and a pair of parallel electrodes 3 and 4 devoid of any delay properties, for example, simple smooth plates 3 and 4 defining therebetween a wave guide devoid of any delay properties, as is well known to those skilled in the art. An electric field is applied between electrodes 3 and 4 by means of connections 5 and 6 and the source 14. The surface of the cathode 2 is substantially aligned with the surface of the electrode 4 which is carried at a negative potential with respect to the electrode 3 whereas the extension of the electrode 3, carried at a positive potential with respect to the electrode 4, is disposed facing the cathode 2 and operates as electron-optical anode. The cathode 2 and the heating filament are fed by means of connections 7 and 8.

At the output of the space between the electrodes 3 and 4 is located a collector 9, reduced into a simple bent bar, and preferably realized of tubular construction so as to be able to be cooled by the circulation of a liquid flowing therethrough by interconnection with a circulatory cooling system at connecting nipples 10 and 11; the collector 9 may be carried at the same direct-current potential as the plate electrode 3.

The tube is placed within a transverse magnetic field formed by the pole pieces 12 and 13; the intensity of the magnetic field is such that the electrons issued from the cathode 2 are concentrated into a beam of which the path is initially curved, and which passes with a desired speed through the drift space between the electrodes 3 and 4 to be captured by the collector 9.

According to the present invention, there is inserted within the circuit of collector 9 a load impedance schematically indicated by block 15 which may be either a simple resistance or a filter, such as a quadripole having filtering properties, for example, effectively forming a low pass filter for frequencies of 0 to 200 megacycles. The noise voltage is collected for use at the terminals of the output 16 of the load impedance 15.

As a result of tests conducted by applicant, it has been established that the noise generator described hereinabove and made in conformity with the present invention is susceptible to deliver at the output terminals 16 a noise power of the order of 5 milliwatts per megacycle of frequency band, that is one watt for the band of 0 to 200 megacycles, assumed for illustrative purposes herein, and for a power of the order of 30 watts placed into the beam. Noise powers of this order of magnitude are unusual in the noise generators known heretofore in the prior art.

In the modified embodiment of FIGURE 3, each of the electrodes 3 and 4 is divided into two parts 3′, 3″, and 4′, 4″, respectively, the distance between portions 3″ and 4″ within the region of the collector being increased with respect to distance between portions 3′ and 4′ in order to reduce the output capacity. The voltage between portions 3″ and 4″ will then be increased with respect to the voltage between portions 3′ and 4′, in proportion to the increase of the distance, in order to maintain the same value of electric field. Of course, it is also understood that if deemed sufficient, only one of these electrodes 3 or 4 may be divided into two portions as indicated in connection with FIGURE 3 while the other electrode remains as shown in FIGURES 1 and 2.

Figure 4:
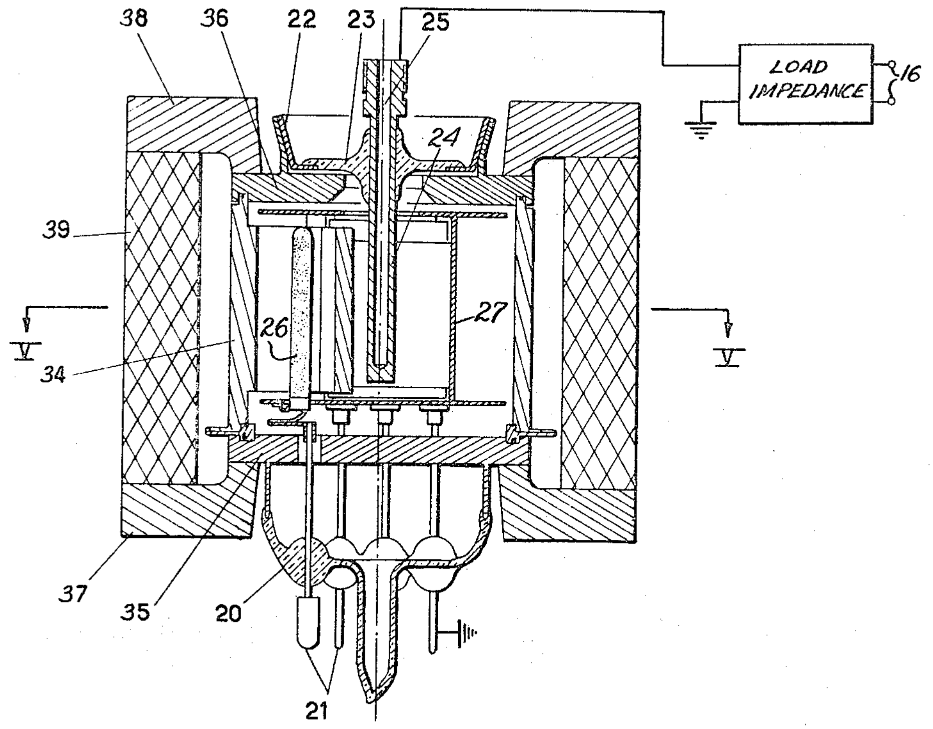
FIGURE 4 is an axial cross sectional view through still a further modified embodiment of a noise generator tube of circular structure in accordance with the present invention.
Figure 5:
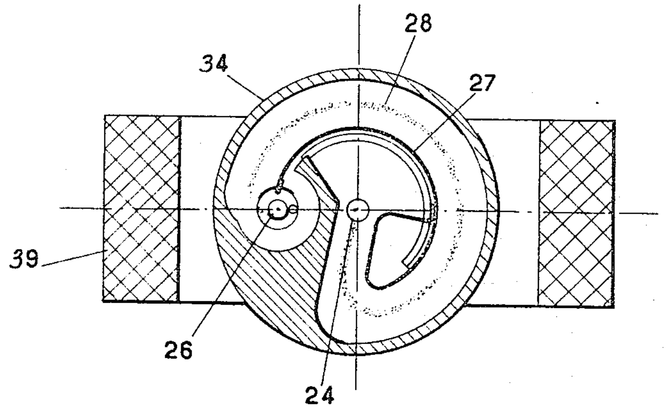
FIGURE 5 is a cross sectional view of the noise generator of FIGURE 4, taken along line V—V of FIGURE 4.

In the modified embodiment of FIGURES 4 and 5, the lateral wall of the evacuated enclosure, a wall which at the same time forms one of the two electrodes devoid of delay properties, is constituted by a metallic cylinder 34. The covers of this cylinder made of magnetic material form the pole pieces 35 and 36, it being assumed that the magnetic field is supplied in this embodiment by a permanent magnet. These pole pieces 35 and 36 are connected to the magnetic circuit formed by yoke portions 37 and 38 and bars 39. The pole piece 35 is connected to the glass seal 20 completing the vacuum-tight enclosure and permitting the passage of the electric connections 21. The other pole piece 36 is connected in a vacuum-tight manner to a metallic trough-like member 22 in which is provided an insulating passage 23 completing, on the other hand, the vacuum-tight enclosure and permitting the passage of the collector 24 which in this embodiment is realized in the form of an axial rod thereby assuring a very reduced output capacity. This collector 24 may also be cooled by means of a liquid circulating within the channel 25 and is connected to a load impedance 15 in the same manner as collector 9 in FIGURE 1.

On the inside of the vacuum tight enclosure is disposed a cathode 26 in the form of a cylinder, and a second electrode 27 without delay characteristics in the form of a cylindrical surface coaxial with the cylinder 34. These electrodes 26 and 27 are fed by connections 21 in such a manner as to heat the cathode 26 and to carry the same at a suitable potential with respect to the cylinder 34, and in such a manner as to establish an electric field between the electrodes 34 and 27. This field is crossed with the magnetic field supplied by the pole pieces 35 and 36, these two fields being transverse with respect to the direction of circulation of the electrons emitted by the cathode 26 within the interelectrode space between electrodes 34 and 27, these electrons being finally captured by the collector 24.

The operation of this tube as noise generator is the same as that of the embodiment described hereinabove.

While we have shown and described several embodiments in accordance with the present invention, it is understood that the same is not limited thereto but is susceptible of numerous changes and modifications within the spirit and scope thereof as known to a person skilled in the art, and we therefore do not wish to be limited to the details shown and described herein but intend to cover all such changes and modifications as are encompassed by the scope of the appended claims.

We claim:

1. A noise generator including an electron discharge device, comprising:
- a plurality of substantially coaxial electrode means substantially devoid of delay characteristics and defining a drift space for the flow of electrons,
- means for emitting electrons adapted to move through said drift space,
- means for establishing within said space substantially transverse electric and magnetic fields disposed substantially perpendicular to each other to thereby cause the flow of said electrons substantially perpendicularly to both of said fields, the lines of force of the electric field extending substantially radially and the lines of force of the magnetic field substantially axially of said coaxial electrode means,
- collector electrode means separate from said first-mentioned electrode means and operatively associated with said drift space for collecting the electrons,
- and output connected in series with said collector electrode means for abstracting noise signals generated within said tube.

2. A noise generator according to claim 1, wherein said output means is constituted by a resistor connected in series with said collector electrode means including means for picking up noise signals across the output means.

3. A noise generator according to claim 1, wherein said output means is constituted by a quadripole circuit connected in series with said collector electrode means for picking up noise signals across said output means.

4. A noise generator according to claim 1, wherein said output means is constituted by a quadripole circuit provided with band filtering means connected in series with said collector electrode means including means for picking up noise signals across said output means.

5. A noise generator including an electron discharge device, comprising:
- two hollow, substantially cylindrical electrode means disposed substantially coaxially to each other and defining a non-reactant annular duct therebetween,
- means for establishing within said duct substantially transverse electric and magnetic fields disposed substantially perpendicular to each other,
- means including an electron source disposed near one end of the duct for injecting into said duct a stream of electrons propagating therethrough substantially perpendicularly to said transverse field,
- collector electrode means disposed near the other end of said duct for collecting the electrons,
- and output circuit means connected in series with said collector electrode means including means for picking up noise signals across said output circuit means.

6. A noise generator including an electron discharge device comprising:
- two hollow, substantially cylindrical electrode means disposed substantially coaxially to each other and defining a non-reentrant annular duct therebetween,
- means for establishing within said duct substantially transverse electric and magnetic fields disposed substantially perpendicular to each other,
- means including an electron source disposed near one end of the duct for injecting into said duct a stream of electrons propagating therethrough substantially perpendicularly to said transverse field,
- collector electrode means separate from said first-mentioned electrode means and formed by an axial rod in said cylindrical structure and disposed near the other end of said duct for collecting the electrons,
- and output circuit means connected in series with said collector electrode means including means for picking up noise signals across said output circuit means.

(References on following page)

References Cited

UNITED STATES PATENTS

| | | | |
|---|---|---|---|
| 2,414,121 | 1/1947 | Pierce | 331—86 X |
| 2,416,307 | 2/1947 | Grieg | 331—78 X |
| 2,462,698 | 2/1949 | Wilbur | 315—39 |
| 2,748,277 | 5/1956 | Haagensen | 331—78 |
| 2,776,374 | 1/1957 | Iskenderian | 331—86 X |
| 3,066,237 | 11/1962 | Nevins | 315—5.38 |
| 3,071,709 | 1/1963 | Paananen et al. | 315—39.3 |
| 3,076,118 | 1/1963 | LaBeaume | 331—78 X |

OTHER REFERENCES

Reich et al.: Microwave Theory and Techniques, Van Nostrand, N.Y., 1953, p. 755.

Pierce: Theory and Design of Electron Beams, Second Edition, 1954, Van Nostrand, New York, pages 26–28.

ROY LAKE, *Primary Examiner.*

JOHN KOMINSKI, *Examiner.*

S. H. GRIMM, *Assistant Examiner.*